(12) United States Patent
Hager (10) Patent No.: US 9,546,338 B2
(45) Date of Patent: *Jan. 17, 2017

(54) REDOX COUPLE-BASED MITIGATION OF FLUID-FLOW-DRIVEN ELECTROCHEMICAL SURFACE DEGRADATION

(71) Applicant: The Boeing Company, Chicago, IL (US)

(72) Inventor: Harold E Hager, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/010,073

(22) Filed: Jan. 29, 2016

(65) Prior Publication Data
US 2016/0152919 A1 Jun. 2, 2016

Related U.S. Application Data (63) Continuation of application No. 13/948,413, filed on Jul. 23, 2013.

(51) Int. Cl.
| | | |
|---|---|---|
| C10M 169/04 | (2006.01) | |
| C10M 113/08 | (2006.01) | |
| C10M 139/06 | (2006.01) | |
| C09K 15/32 | (2006.01) | |
| C10M 105/74 | (2006.01) | |

(52) U.S. Cl.
CPC ............ *C10M 139/06* (2013.01); *C09K 15/32* (2013.01); *C10M 105/74* (2013.01); *C10M 169/04* (2013.01); *C10M 2223/0405* (2013.01); *C10M 2223/0415* (2013.01); *C10M 2227/081* (2013.01); *C10N 2230/12* (2013.01); *C10N 2240/08* (2013.01); *C10N 2240/121* (2013.01)

(58) Field of Classification Search
CPC .......... C10M 169/04; C10M 2207/081; C10M 105/74; C10M 139/06; C10M 2223/0405; C10M 2223/0415; C10M 2227/081; C10N 2230/12; C10N 2240/08; C10N 2240/121; C09K 15/32
USPC ......................................... 508/165, 171, 384
See application file for complete search history.

(56) References Cited

U.S. PATENT DOCUMENTS

| | | | |
|---|---|---|---|
| 4,169,800 A | 10/1979 | Dounchis | |
| 6,254,799 B1 * | 7/2001 | Antika | ................. C10M 105/74 252/78.5 |
| 2005/0227369 A1 | 10/2005 | Richardson et al. | |

(Continued)

FOREIGN PATENT DOCUMENTS

| | | |
|---|---|---|
| CA | 2678583 A1 | 9/2008 |
| WO | WO02086012 | 10/2002 |
| WO | WO02086035 A1 | 10/2002 |

OTHER PUBLICATIONS

Lewandowski, a., Waligora, L., Galinski, M., "Ferrocene as a Reference Redox Couple for Aprotic Ionic Liquids", Electroanalysis, 2009, 21, No. 20, 2221-2227.*

(Continued)

*Primary Examiner* — James Goloboy (57) ABSTRACT

The present disclosure relates to methods, systems, hydraulic fluids and additives for reducing the rate of surface current degradation for components in a hydraulic system, wherein the hydraulic system is exposed to phosphate-ester-based hydraulic fluid.

12 Claims, 2 Drawing Sheets

Blow-up highlighting near-surface region & electrical double layer (56) References Cited

U.S. PATENT DOCUMENTS

2008/0206874 A1* 8/2008 Manka .................. G01N 21/78
436/2

OTHER PUBLICATIONS

Beck et al., "Corrosion of Servo Valves by an Electronkinetic Streaming Current," Boeing Scientific Research Laboratories, copyright 1969, AD695492, 143 pages.
Beck et al. "Wear of Small Orifices by Streaming Current Driven Corrosion," Copyright 1970, Journal of Basic Engineering 92, pp. 782-788.
Beck et al., "Electrokinetic-Current Corrosion: I.Valves," Journal of the Electrochemical Society 2006, vol. 153, Issue 5, pp. B181-B186.
Beck et al., "Electrokinetic-Current Corrosion: II. Lubricated Systems," Journal of the Electrochemical Society 2006, vol. 153, Issue 5, pp. B187-B191.
European Search Report 14177692.Feb. 1352 related to application 13948413 Dec. 3, 2014.
N. Brinis, K. Aoudia, L. Chaal; B. Saidani, C. Deslouis, Heterogeneous electron transfer and diffusivities of ferrocene./ferrocenium couple in toluent/phosphonium-based ionic liquid solutions; Journal of Electroanalytical Chemistry 2013, 692, 46-52.
Office Action for CA 2852511 citing 2 references Jan. 25, 2016.

\* cited by examiner

REDOX COUPLE-BASED MITIGATION OF FLUID-FLOW-DRIVEN ELECTROCHEMICAL SURFACE DEGRADATION

TECHNOLOGICAL FIELD

The present disclosure relates generally to the field of hydraulic systems. More specifically, the present invention relates to methods and additives for mitigating electrokinetically driven processes that occur in hydraulic systems.

BACKGROUND

As the aerospace industry transitioned from hydrocarbon-based hydraulic fluids to phosphate-ester-based hydraulic fluids it became apparent that hydraulic components (e.g. valves) that had operated reliably using the hydrocarbon-based hydraulic fluids were degrading prematurely during operation. It is believed that the use of phosphate-ester-based fluids may contribute to the erosion of the valve components, leading to unacceptable valve performance (e.g. leaking valves). An analysis of the factors causing valve failure in hydraulic systems revealed that electrokinetically driven corrosion is a significant contributing factor. This corrosion is induced by the "sweeping of charge" in the electrical double layer that extends from the valve surface into the hydraulic fluid, resulting in electrochemical current driven between the valve and fluid. The term "sweeping of charge" is understood to mean putting a greater amount of charge in or out of fluid located at the valve surface. Replacement of the hydrocarbon-based hydraulic fluid with a phosphate-ester-based hydraulic fluid has therefore had the undesirable consequence of modifying the electrical double layer to produce larger electrochemical currents, and therefore more significant corrosion.

The magnitude of the electrokinetically driven current, for a given fluid velocity distribution, is primarily determined by the amount of charge in the electrical double layer, and the overlap of the charge distribution in the electrical double layer with the velocity profile in the hydraulic fluid. As new hydraulic system designs employ higher pressures and more advanced and more compact valve structures designed for more rapid operation, the resulting higher fluid velocities in smaller valve geometries produce substantially higher electrokinetically driven surface current densities.

Therefore, as valve geometries become more constrained and hydraulic operating pressures increase in hydraulic systems, the commercially available phosphate-ester-based hydraulic fluids, even with their additives, are incapable of reducing the electrokinetically driven surface currents.

The problem of hydraulic valve erosion has been addressed by including additives to the phosphate-ester-based hydraulic fluid that: (1) reduce the next surface charge, and hence the charge in the electrical double layer; and/or (2) increase the ionic conductivity of the fluid to collapse the electrical double layer so that the net ionic charge is localized much closer to the component surface, (i.e., in the region of much lower fluid velocity).

BRIEF SUMMARY

The present disclosure relates to a method for reducing rate of surface current induced degradation for components in a hydraulic system, the hydraulic system having components exposed to phosphate-ester-based hydraulic fluid, comprising the step of adding a redox couple to the hydraulic fluid. The redox couple selected provides a preferential path for both oxidation currents and reduction currents in the hydraulic system. Surface current degradation includes any detrimental change occurring to the surface of hydraulic system components including, for example, corrosion and deposition. Deposition is understood to include plating deposition.

The present disclosure further relates to a hydraulic system comprising a phosphate-ester-based hydraulic fluid and a redox couple selected to provide a preferential path for both oxidation currents and reduction currents in the hydraulic system.

The present disclosure further relates to a hydraulic fluid for use in a hydraulic system, the fluid comprising a phosphate-ester-based compound and a redox couple. The redox couple, more specifically, is selected to provide a preferential path for both oxidation currents and reduction currents in the hydraulic fluid.

Still further, the present disclosure is directed to an additive for a hydraulic fluid comprising a redox couple, and more specifically, an additive comprising a redox couple for a phosphate-ester-based hydraulic fluid. The additive comprises a redox couple selected to provide a preferential path for both oxidation currents and reduction currents in an hydraulic system.

As a consequence of the addition of the additive to the hydraulic system, the current responsible for corrosion and the current responsible for film formation are both reduced to small fractions (less than about 2.5%) of the respective oxidation current value and reduction current value occurring during standard operation without the additive. Aspects of the present disclosure therefore minimize the electrokinetically-driven surface currents that are associated with degradation of hydraulic system components, resulting in a surface current that is "shunted" through the desired redox reactions provided by the additive (i.e. the added redox couple), rather than through existing reaction pathways in the known hydraulic fluid systems. Therefore, according to methods, systems, hydraulic fluid and additives of the disclosure, the electrokinetically-driven corrosion rate and deposition rate of hydraulic component surfaces in a hydraulic system are significantly reduced.

Aspects of the disclosure comprise a redox couple comprising a metallocene couple. Further aspects of the disclosure comprise a redox couple comprising compounds having the general formula: $M(A_r)_2^{+/0}$, where M is a transition metal. Useful transition metals include, for example, Cr, Fe, Co, Ni, Pb, Zr, Ru, Rh, Sm, Ti, V, Mo, W, Zn; and $A_r$ is an aryl compound.

According to another aspect of the invention, the redox couple comprises metallocene couples of the form $M(C_p)_2^{+/0}$, where M is a transition metal, for example, Fe, Co, Mn, Cr, Ni, V; and $C_p$ is a cyclopentadiene-containing compound. A non-exhaustive listing of useful metallocene redox couples include Fe(cyclopentadiene)$_2^+$ and Fe(cyclopentadiene)$_2^0$; Fe(pentamethylcyclopentadiene)$_2^+$ and Fe(pentamethylcyclopentadiene)$_2^0$; Ni(cyclopentadiene)$_2^+$ and Ni(cyclopentadiene)$_2^0$; Co(cyclopentadiene)$_2^+$ and Co(cyclopentadiene)$_2^0$; decamethylferricinum and decamethylferrocene; Fe(pentamethylcyclopentadiene)$_2^+$ and (pentamethylcyclopentadiene)$_2^0$.

A non-exhaustive listing of useful cyclopentadiene sandwich-type metallocene compounds include Fe(cyclopentadiene); Ni (cyclopentadiene); Co(cyclopentadiene); Ti(cyclopentadiene); Cr(cyclopentadiene); Fe(pentamethylcyclopentadiene), and charged forms thereof. Useful mixed cyclopentadienyl sandwich-type metallocene compounds include Ti(C$_5$H$_5$)(C$_7$H$_7$); and (C6)Fe (C$_5$H$_5$Ph)$_5$, and charged forms thereof.

Commonly available phosphate-ester-based hydraulic fluids comprise phosphate-based compounds including: triaryl, trialkyl, tri-substituted aryl/alkyl phosphate esters, and combinations thereof, and more specifically comprises tricresyl-; trixylenyl-; trialkyl phenyl-; isopropyl phenyl-; isopropylphenyl diphenyl; isopropyl triphenyl-; dibutyl phenyl-; tributyl phenyl-; di(tert-butylphenyl)phenyl-; tert-butylphenyl-; tert-butylphenyl diphenyl-; tert-butyl triphenyl-phosphate esters and combinations thereof.

Accordingly, the present disclosure further relates to objects, aircraft, vehicles and stationary structures and equipment comprising the above-described hydraulic systems, hydraulic fluids or additives.

BRIEF DESCRIPTION OF THE DRAWINGS

Having thus described variations of the disclosure in general terms, reference will now be made to the accompanying drawings, which are not necessarily drawn to scale, and wherein:

DETAILED DESCRIPTION

Additives and methods of the present disclosure will be used in conjunction with the existing, commercial phosphate-ester-based hydraulic fluids to provide hydraulic system component protection that commercial fluids cannot provide on their own. Therefore, the additives and methods of the present disclosure, when used with the existing phosphate-ester-based hydraulic fluids, provide hydraulic valve and system protection that is currently not available or known. Aspects of the present disclosure minimize the electrokinetically driven surface currents that are associated with degradation of hydraulic system components, resulting in a residual surface current that is "shunted" through the desired redox reactions, rather than through reaction pathways that produce hydraulic system component degradation (e.g. deposit formation or corrosion).

The approaches disclosed herein reduce the electrokinetically driven surface currents by reducing the magnitude of the spatially-varying swept current. The methods of the present disclosure employ a redox couple additive that provides the preferential pathway for the electrokinetically driven surface current. The redox couple additive will supplement the protection of the existing solution to reduce corrosion or plating reaction rates to acceptable levels when the presently known phosphate-ester-based hydraulic fluids cannot provide the required protection, particularly at higher flow rates in tighter geometries.

Figure 1A:
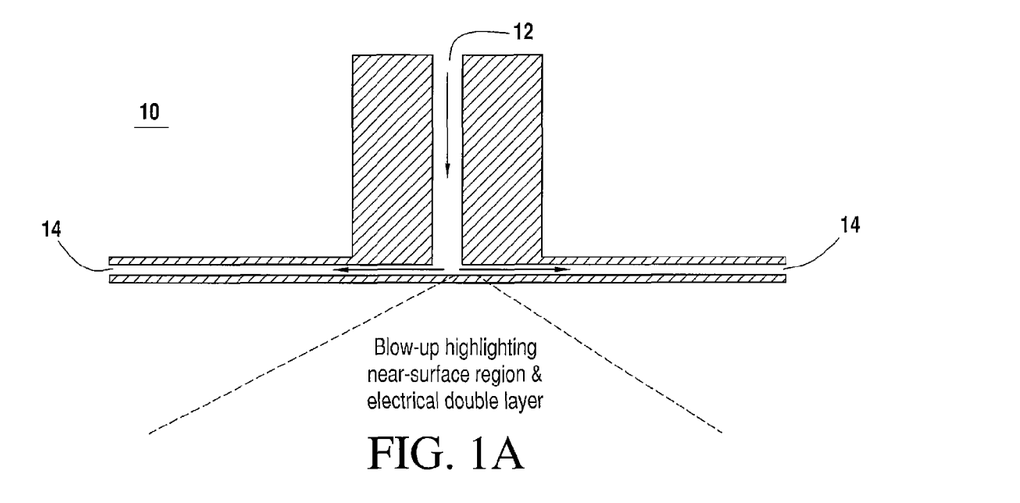
FIG. 1A is a schematic representation of a varying fluid flow overlapping with near-surface diffuse electrical double layer.

The origin of electrokinetically driven surface currents can be understood by referring to the simplified drawings in FIGS. 1A-C and 2. FIG. 1A shows a simple schematic representation of the type of structure 10 that can generate electrokinetically driven surface currents, with an enlarged schematic view of the region where the fluid flow transitions from an area of large cross section 12 to a much smaller cross section 14. It should be noted that as the fluid accelerates in this transition region, the fluid also changes direction.

Figure 1B:
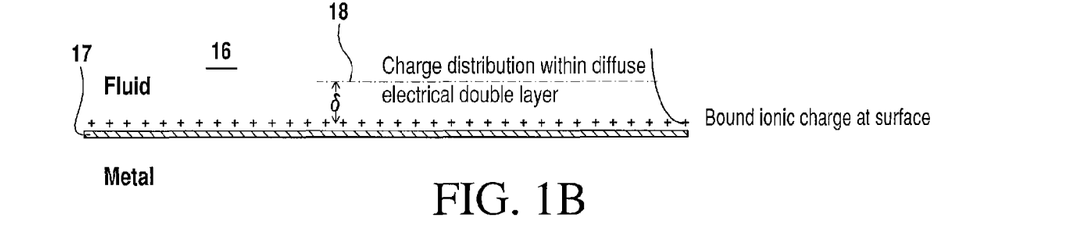
FIG. 1B is a schematic representation showing the charges in an electrical double layer.

The enlarged schematic representation shown in FIG. 1B shows the electrical double layer in the fluid 16, for a fluid of modest ionic concentration. A critical feature here is the presence of the diffuse electrical double layer region 18 that extends into the fluid a distance from a surface 17 with a characteristic length scale of δ.

Figure 1C:
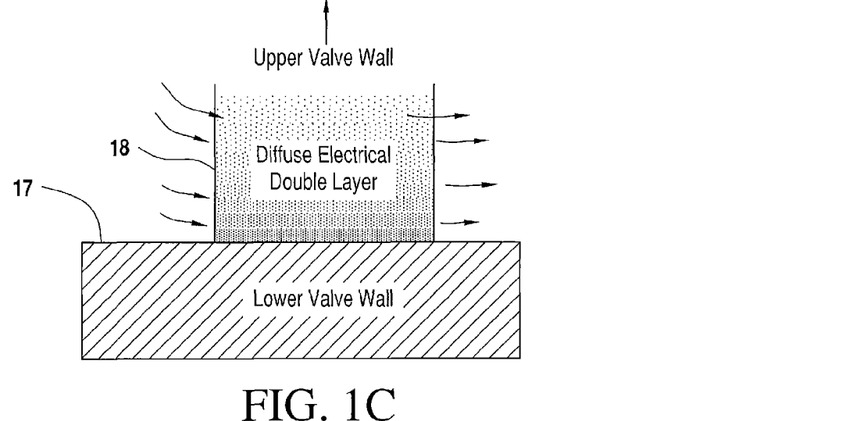
FIG. 1C is a schematic representation showing the overlap of spatially varying fluid flow with diffuse electrical double layer.
Figure 2:
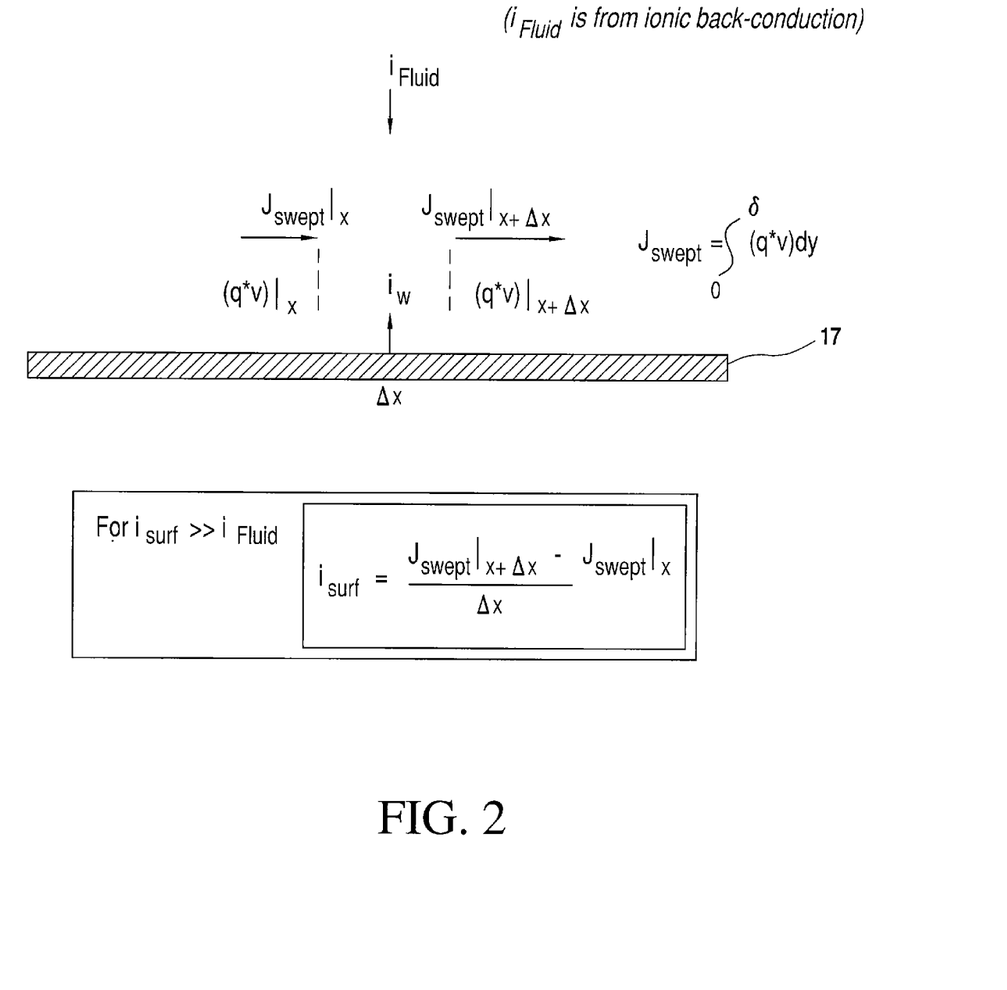
FIG. 2 is a schematic representation with formula showing unbalanced sweeping of surface current charge.

FIG. 1C outlines the origin of the electrokinetically driven surface current. Due to the transitioning velocity through the fluid with net charge, (i.e., through the diffuse electrical double layer region 18 of the fluid) the net charge swept into the fluid element $J_{swept}|_x$ is not balanced by the net charge swept out of this fluid element $J_{swept}|_{x+\Delta_x}$, as shown in FIG. 2. As a consequence, currents normal to the surface are created to balance this net charge swept by the fluid flow, as shown in Equation 1.

$$I_{surf} + i_{fluid} = \frac{J_{swept}|_{x+\Delta_x} - J_{swept}|_x}{\Delta_x} \quad \text{Equation 1}$$

Here $I_{surf}+i_{fluid}$ are the normal currents at the surface and in the fluid, respectively, which together offset the net swept charge. For typical conditions of concern (flow rate and fluid ion concentration) $I_{surf} \gg i_{fluid}$ and Equation 1 can be approximated as shown in Equation 2:

$$I_{surf} \simeq \frac{J_{swept}|_{x+\Delta_x} - J_{swept}|_x}{\Delta_x} \quad \text{Equation 2}$$

This surface current, $I_{surf}$, can be either an oxidation current or reduction current, depending on the polarity of the net swept charge $J_{swept}|_{x+\Delta_x} - J_{swept}|_x$.

Upon replacement of hydrocarbon-based hydraulic fluids with phosphate-ester-based hydraulic fluids (motivated by the reduced flammability of the phosphate-ester-based fluids) unexpected valve erosion was observed in the hydraulic systems of commercial aircraft. After comprehensive analysis it was concluded that the ionic concentrations in the initial versions of phosphate-ester-based hydraulic fluids were unfortunately almost perfectly suited to maximize the net swept current (and as a consequence surface current), which in this case produced electrochemical corrosion of the valves in the region of rapid fluid flow rate changes (i.e. large spatially-varying velocity changes).

To describe this more quantitatively, the Debye length, denoted as $\kappa^{-1}$, gives physical length scale for the diffuse electrical double layer as shown in Equation 3:

$$\kappa^{-1} = [(\epsilon_r \epsilon_0 k_B T)/(2N_A e^2 I)]^{0.5} \quad \text{Equation 3}$$

where:
I is the ionic strength of the electrolyte, (mole/m$^3$),
$\epsilon_0$ is the permittivity of free space,
$\epsilon_r$ is the dielectric constant,
$k_b$ is the Boltzmann constant,
T is the absolute temperature (kelvin),
$N_A$ is Avogadro's number.
e is the electron charge, A key feature of Equation 3 is the Debye length dependence on the inverse square root of the fluid's ionic strength, I. Thus, as the fluid ionic strength I is reduced, the diffuse electrical double layer extends farther from the surface, spatially overlapping to a greater extent with regions of higher fluid velocity. This factor is offset by the magnitude of the net charge in the diffuse electrical double layer, which (aside from specific charge absorption at the surface) goes down as the ionic strength is reduced. These opposing trends: 1) more physical overlap with higher fluid velocity with decreasing I, and 2) reduced charge with decreasing I, produce a maximum surface current at intermediate ionic strengths. Indeed, the previously used hydrocarbon-oil-based hydraulic fluids had very low ionic concentrations, and thereby had very little charge in the electrical double layer. At the other extreme, a fluid with a high ionic concentration has an electrical double layer that is localized very near the surface, in a region of much reduced velocity. Phosphate-ester-based hydraulic fluids have ionic strengths that promote maximum surface currents for a given rate of fluid flow variation.

FIG. 2 shows unbalanced sweeping of charge, due to spatially varying fluid flow field, sets up a compensating surface current. The surface current will produce electrochemical oxidation or reduction, depending on the net polarity of the swept charge. These reactions can correspondingly produce corrosion or plating depending on the solubility of the reaction species.

With this realization, the formulators/suppliers of phosphate-ester-based hydraulic fluids attempted to minimize the swept charge-induced surface current by adding ions into the fluid so that the diffuse electrical double layer could be collapsed closer to the surface, and to minimize the overlap of electrical double layer charge with higher fluid flow rates. Beyond this, fluid additives which reduced the charge in the electrical double layer by modifying the adsorbed surface charge could further reduce the amount of net swept charge. While the specific chemistries used to deploy these two approaches have been kept confidential by the hydraulic fluid vendors, it is clear that these two approaches have been generally followed in formulating phosphate-ester-based hydraulic fluids that attempted to reduce valve erosion to acceptable values.

However, more recently, the design of hydraulic fluid systems for aircraft have implemented smaller and more restrictive valve geometries and higher system pressures, producing larger local velocity variations in critical valve areas. Also significantly, published studies have shown that, at larger local velocity transitions in phosphate-ester-based hydraulic fluids, the surface current changes polarity from an oxidizing (corrosion) current to a reducing (plating) current. And these results show that the reduction current increases further as the local velocity gradients increase in strength.

Opportunities to eliminate this swept charge-based plating deposition or corrosion-based erosion by exploiting use of ionic additives to further reduce the dimension of the diffuse double layer are not practical, due to the fact that ionic additives have already reached their solubility limit within the phosphate-ester based solutions. While it is conceptually possible to find additives that will further reduce the magnitude of the charge in the diffuse electrical double layer (e.g., by judiciously controlling the adsorbed surface charge), such a mitigation approach suffers from the fact that the bound surface charge is significantly dependent on the fluid chemistry. It is well known that phosphate-ester-based hydraulic fluids demonstrate chemical changes with use, making it difficult to have confidence that a fluid, showing very low initial charge in the diffuse electrical double layer, will continue to have low double layer charge over the extended periods, and wide operating conditions associated with modern and emerging aircraft operation.

The present disclosure's approaches for mitigating high velocity gradient flow-induced surface current induced degradation (either plating or corrosion) are based on an alternative mechanism to the prior approaches. The disclosed methods recognize that, with increasingly smaller geometries in hydraulic systems, and the desire to operate hydraulic systems at higher pressures, the known hydraulic fluid formulation approaches that have been designed to effectively eliminate flow-induced surface currents, ultimately will be unable to confidently provide long-term component protection. As an alternative, the present disclosure proposes improved techniques to minimize electrokinetically-induced surface current degradation.

According to aspect, a redox couple is added to the hydraulic fluid. As a key characteristic, the redox couple provides the predominant reaction pathway for both oxidation and reduction currents in the hydraulic system (i.e. these currents will be driven in different regions of the hydraulic system), so that just as the total of oxidation and reduction currents sum to near zero in the hydraulic system, there is no net (or at least negligible net) reaction of the redox couple.

According to one aspect, a redox couple includes a metallocene couple of the formula $M(C_p)_2^{+/0}$, where M is a transition metal, (e.g., Fe, Co, Mn, Cr, Ni, V) and $C_p$ is cyclopentadiene, or variations of cyclopentadiene (e.g., pentamethylcyclopentadiene, etc.). Two specific examples of a metallocene couple include, $Fe(cyclopentadiene)_2^+$ and $Fe(cyclopentadiene)_2^0$ and the decamethyl derivatives (e.g. $Fe(pentamethylcyclopentadiene)_2^+$ and $Fe(pentamethylcyclopentadiene)_2^0$). The reversible one-electron oxidation/reduction at relatively low potentials (e.g., about 0.5 V vs. a saturated calomel electrode for the, $Fe(cyclopentadiene)_2^+$ and $Fe(cyclopentadiene)_2^0$ couple (also known as ferrocenium and ferrocene couple), represent critical attributes of the metallocene couples. Furthermore, the redox potential for a given transition metal can be adjusted by modifying the substituents on the cyclopentadienyl ligands in the metallocene. Here an electron withdrawing group, such as carbonyl, nitrile, halogen or nitro group shifts the potential in the anodic direction. An electron releasing group such as, alkyl, alcohol or amino group shifts the potential in the cathodic direction. Thus, the metallocene can be systematically designed to have a redox potential providing the required surface current protection to ensure that the surface current is predominantly carried by electrochemical reaction of the selected metallocene redox couple. Other bi-valent redox couple chemistries, including extensions of sandwich chemistry (including multi- and double-sandwich compounds) beyond metallocenes, represent additional potentially useful redox couple approaches that are contemplated by the present disclosure. An example of a half-sandwich compound is cyclopentadienylcobalt dicarbonyl of formula $(C_5H_5)Co(CO)_2$.

Further, aspects of the disclosure comprise, as redox couple, a sandwich compound of the formula: $M(A_r)_2^{+/0}$, where M is a transition metal. Useful transition metals include Cr, Fe, Co, Ni, Pb, Zr, Ru, Rh, Sm, Ti, V, Mo, W, Zn; and $A_r$ is an aryl compound. Useful cyclopentadiene sandwich-type metallocene compounds include Fe(cyclopentadiene); Ni (cyclopentadiene); Co(cyclopentadiene); Ti(cyclopentadiene); Cr(cyclopentadiene); Fe(pentamethylcyclopentadiene) and charged forms thereof. Useful mixed cyclopentadienyl sandwich-type metallocene compounds include $Ti(C_5H_5)(C_7H_7)$; and $(C6)Fe(C_5H_5Ph)_5$ and charged forms thereof.

The terms "substituent", "radical", "group", "moiety" and "fragment" may be used interchangeably.

The symbol "H" denotes a single hydrogen atom and may be used interchangeably with the symbol "—H". "H" may be attached, for example, to an oxygen atom to form a "hydroxy" radical (i.e., —OH), or two "H" atoms may be attached to a carbon atom to form a "methylene" (—CH$_2$—) radical.

The terms "hydroxyl" and "hydroxy" may be used interchangeably.

If a substituent is described as being "optionally substituted," the substituent may be either (1) not substituted or (2) substituted on a substitutable position. If a substitutable position is not substituted, the default substituent is H.

Singular forms "a" and "an" may include plural reference unless the context clearly dictates otherwise.

The number of carbon atoms in a substituent can be indicated by the prefix "$C_{A-B}$" where A is the minimum and B is the maximum number of carbon atoms in the substituent.

The term "halo" refers to fluoro (—F), chloro (—Cl), bromo (—Br) or iodo (—I).

The term "alkyl" embraces a linear or branched acyclic alkyl radical containing from 1 to about 15 carbon atoms. In some embodiments, alkyl is a $C_{1-10}$alkyl, $C_{1-6}$alkyl or $C_{1-3}$alkyl radical. Examples of alkyl include, but are not limited to, methyl, ethyl, propyl, isopropyl, butyl, isobutyl, tert-butyl, sec-butyl, pentan-3-yl (i.e., ⁓⁓⁓⁓)

and the like.

The term "hydroxyalkyl" embraces alkyl substituted with one or more hydroxyl radicals. Hydroxyalkyl embraces, for example, monohydroxyalkyl, dihydroxyalkyl and trihydroxyalkyl. More specific examples of hydroxyalkyl include hydroxymethyl, hydroxyethyl and hydroxypropyl (e.g., 2-hydroxypropan-2-yl).

The term "haloalkyl" embraces alkyl substituted with one or more halo radicals. Examples of haloalkyl include monohaloalkyl, dihaloalkyl and trihaloalkyl. A monohaloalkyl radical, for example, may have either a bromo, chloro or a fluoro atom. A dihalo radical, for example, may have two of the same halo radicals or a combination of different halo radicals. A trihaloalkyl radical may have three of the same halo radicals or a combination of different halo radicals. Non-limiting examples of haloalkyl include fluoromethyl, difluoromethyl, trifluoromethyl (or CF$_3$), difluoroethyl, trifluoroethyl, difluoropropyl, tetrafluoroethyl, pentafluoroethyl, heptafluoropropyl, chloromethyl, dichloromethyl, trichloromethyl, dichloroethyl, trichloroethyl, dichloropropyl, tetrachloroethyl, pentachloroethyl, heptachloropropyl, dichlorofluoromethyl, difluorochloromethyl, bromomethyl, dibromomethyl, tribromomethyl, iodomethyl, diiodomethyl and triiodomethyl.

The term "alkoxy" is RO— where R is alkyl. Non-limiting examples of alkoxy radicals include methoxy, ethoxy, propoxy and tert-butyloxy. The terms "alkyloxy", "alkoxy" and "alkyl-O—" may be used interchangeably.

The term "alkoxyalkyl" is ROR—, where R is alkyl. Examples of alkoxyalkyl radicals include methoxymethyl, methoxyethyl, methoxypropyl, ethoxyethyl and 2-methoxypropan-2-yl. The terms "alkoxyalkyl" and "alkyl-O-alkyl" may be used interchangeably.

The term "cyano" refers to a carbon radical having three of four covalent bonds shared by a single nitrogen atom

(e.g., ).

The term "carbonyl" denotes a carbon radical having two of four covalent bonds shared with a single oxygen atom

(e.g., ).

The term "acyl", is where R may be, for example, H, alkyl, aryl or heteroaryl. More specific examples of acyl include formyl, acetyl and benzoyl.

The term "carboxy" embraces hydroxy attached to one of two unshared bonds in a carbonyl radical (e.g., ).

The term "cyclic ring" embraces any aromatic or non-aromatic cyclized carbon radical (e.g., aryl and cycloalkyl, respectively) which may contain one or more ring heteroatoms (e.g., heterocyclyl and heteroaryl).

The term "cycloalkyl" embraces any monocyclic, bicyclic or tricyclic cyclized carbon radical of 3 to about 15 carbon atoms that is fully or partially saturated. Cycloalkyl may be fused, for example, to an aryl, cycloalkyl or a heterocyclyl radical.

The term "aryl" refers to any monocyclic, bicyclic or tricyclic cyclized carbon radical, wherein at least one ring is aromatic. Additionally, the term "aryl" embraces a compound (e.g., cyclopentadiene) that becomes aromatic through hepatic bounding (e.g., 'eta' or η) to a metal center. An aromatic radical may be fused to a non-aromatic cycloalkyl or heterocyclyl radical. Examples of aryl include phenyl, naphthyl, cyclopentadienyl, indenyl and fluorenyl.

The term "metallocene" embraces a compound having at least one $\eta^3$ to $\eta^5$-bound aryl moiety, wherein a $\eta^3$ to $\eta^5$-bound aryl moiety includes, for example, cycloalkadienyl, indenyl, fluorenyl, and the like.

A partially or fully saturated $\eta^3$ to $\eta^5$-type moiety is also embraced (e.g., when hydrogen is a substituent) for example, partially saturated indenyl or fluorenyl (e.g., tetrahydroindenyl, tetrahydrofluorenyl and octahydrofluorenyl).

A $\eta^3$ to $\eta^5$-bound aryl moiety may be substituted with, for example, alkyl (e.g., methyl, ethyl and propyl) alkoxy (e.g., methoxy and ethoxy), hydroxyl, hydroxyalkyl, halo, haloalkyl (e.g. trifluoromethyl) cyano, carbonyl and or carboxy.

The term "metanocene," embraces a "sandwich", "half-sandwich" and/or "multi-deck sandwich" type compound. For example:

Note: Although a triple decker sandwich is shown, a sandwich having >3 decks (i.e., aryl groups) is embraced by the term "multi-decker sandwich."

Aryl is, for example, cyclopentadienyl, indenyl or fluorenyl;
$R^1$—$R^6$, may be (independently), for example, alkyl (e.g., methyl, ethyl and propyl), alkoxy (e.g., methoxy and ethoxy), hydroxyl, hydroxyalkyl, halo, haloalkyl (e.g., trifluoromethyl), cyano, carbonyl or carboxy;
$N^a$—$n^g$ is, for example, 1, 2, 3, 4, 5 or greater, depending on number of available substitutable positions;
M is, for example, any metal (e.g., transition row or lanthanide, more specifically, Cr, Fe, Co, Ni, Pb, Zr, Ru, Rh, Sm, Ti, V, Mo, W or Zn).

Examples of sandwich-type metallocene compounds include:

| Ring system | Structure | Specific examples |
|---|---|---|
| Cyclopentadiene | (structure with $R^1$, M, $R^2$) | Fe(cyclopentadiene)$_2$<br>Ni(cyclopentadiene)$_2$<br>Co(cyclopentadiene)$_2$<br>Ti(cyclopentadiene)$_2$<br>Cr(cyclopentadiene)$_2$<br>Fe(pentamethylcyclopentadiene)$_2$ |
| Mixed cyclopentadienyl | (structure with $R^3$, M, $R^4$) | Ti(C$_5$H$_5$)(C$_7$H$_7$)<br>(C$_6$)Fe(C$_5$H$_5$Ph$_5$) |
| Benzene | (structure with $R^5$, M, $R^6$) | Cr($\eta^6$—C$_6$H$_6$)$_2$ |

"M" may be, for example, Cr, Fe, Co, Ni, Pb, Zr, Ru, Rh, Sm, Ti, V, Mo, W or Zn. $R^1$ to $R^6$ may be (independently), for example, alkyl (e.g., methyl, ethyl and propyl), alkoxy (e.g., methoxy and ethoxy), hydroxyl, hydroxyalkyl, halo, haloalkyl (e.g., trifluoromethyl), cyano, carbonyl or carboxy).
Further examples of metallocene sandwich-type compounds include cyclooctatetraenyl (e.g., U(C$_8$H$_8$)$_2$ and Th(C$_8$H$_8$)$_2$) and cyclobutadienyl (e.g., Fe(C$_4$H$_4$)$_2$).
Note:
Although only one structural orientation is shown, both orientations are embraced (i.e., staggered and eclipsed).

The terms "metallocene", "sandwich", "half-sandwich" and "multi-deck sandwich" embrace a neutral or charged compound (e.g., metallocene salt). Metallocene salts include, for example, Fe(cyclopentadiene)$_2$$^+$, Ni(cyclopentadiene)$_2$$^+$, Co(cyclopentadiene)$_2$$^+$, Ti(cyclopentadiene)$_2$$^+$, Cr(cyclopentadiene)$_2$$^+$, and Fe(pentamethylcyclopentadiene)$_2$$^+$; wherein the counter ion may be, for example, hexafluorophosphate, sulfate, nitrate, nitrite, tetrafluoroborate or carbonate.

The presently disclosed methods and additives will be used in conjunction with existing hydraulic fluids (i.e., commercial phosphate-ester-based hydraulic fluids and their existing additives). Aspects of the present disclosure significantly minimize the electrokinetically driven surface current that are associated with degradation of hydraulic system components, ensuring that the residual surface current is "shunted" through the desired redox reactions, rather than through reaction pathways that produce hydraulic system component degradation (e.g. deposit formation or corrosion).

The phosphate-ester-based hydraulic fluids to which the additives of the present invention are added include known phosphate-ester-based hydraulic fluids, including, for example those phosphate-ester-based hydraulic fluids comprising compounds derived from organic salts of orthophosphoric acid, and are more specifically the tri-substituted, or tertiary phosphate esters including, e.g. triaryl, trialkyl or aryl/alkyl phosphate esters, etc. Phosphate compounds include, e.g. the tricresyl, trixylenyl, trialkyl phenyl and isopropyl phenyl, isopropylphenyl diphenyl and isopropyl triphenyl phosphate esters, etc. As is understood, alkyl phosphate esters are made from alcohols and include, e.g., tributyl phosphate esters, etc. Aryl phosphate esters are understood to be made from phenols or alkyl phenols. Mixed alkyl/aryl phosphate esters include e.g., dibutyl phenyl, tributyl phenyl, di(tert-butylphenyl)phenyl, tert-butylphenyl, tert-butylphenyl diphenyl, tert-butyl triphenyl phosphate esters, etc.

EXAMPLES

For some experiments, "in-service" phosphate-ester-based hydraulic fluid is used, in particular employing hydraulic fluid that has been sampled from in-service aircraft that have shown corrosion or electro-deposition problems in their hydraulic system valves during aircraft operation. As an alternative to using in-service hydraulic fluid, fresh hydraulic fluid can be employed, but in this case water and other expected in-service contaminants are added to the fluid prior to testing.

Example 1

Testing is run using fluids with and without a metallocene redox couple. The metallocene redox couple is added to the test hydraulic fluid at a concentration ranging from about 0.05% to about 0.4%, by weight of charged metallocene and from about 0.05% to about 0.4% by weight of neutral metallocene. Test hardware is partitioned into two separate test systems: A) the fluid without the metallocene redox couple; and B) the fluid with the metallocene redox couple. Each test system includes:
1. Reservoir for holding hydraulic fluid
2. Pump to pressurize fluid to typical service pressures
3. Pressurized fluid flow path to the test piece
4. Test pieces with internal flow geometry (especially spatial variation of fluid flow velocity) and materials of construction similar to the hydraulic valve being simulated
5. Return flow path on low-pressure side of valve, returning the fluid to the reservoir Each of the test systems supports simultaneous testing of multiple test pieces, by physically running the test pieces in parallel. The pump maintains constant inlet pressure to the test pieces, and in particular maintains pressure, as test pieces are isolated (i.e., valved-off) from the pressurized flow. This configuration permits removing selected test pieces for characterization at differing test times. Typical conditions operate each test system with five test pieces. Test pieces are sequentially tested after 100, 200, 500, 2000, and 5000 hours of operation.

Each test piece is sectioned, rinsed with fresh hydraulic fluid of the same type as used in formulating the test fluid (e.g., the same Skydrol or Hyjet hydraulic fluid product used in the aircraft system of interest), and submitted for physical and chemical characterization. Each test piece is characterized for material loss (corrosion/erosion) and/or material gain (electrodeposition/film formation) by optical microscopy and high-sensitivity analysis tools (e.g., electron probe microanalysis). The magnitude of observed material loss or gain is quantified for each pair of test pieces, one run in a fluid with and one run in a fluid without the metallocene redox couple, to evaluate efficacy of the redox couple. Other experimental parameters include, for example: (1) operation of test system at alternate temperatures and/or inlet pressures; (2) increasing contaminant concentrations to account for projected worse case values; and (3) adding test pieces with variations in surface machining/finishing properties representative of expected manufacturing variations.

Example 2

According to a further Example, testing is run using fluids with and without a ferrocenium/ferrocene redox couple. Ferrocene (0.2 wt %) (CAS registry number 102-54-5, molecular formula $C_{10}H_{10}Fe$) and a Ferrocenium salt, more specifically, Ferrocenium hexafluorophosphate (0.2 wt %) (CAS registry number 11077-24-0, molecular formula $C_{10}H_{10}F_6FeP$) is added to the test hydraulic fluid. Test hardware is partitioned into two separate test systems: A) fluid without ferrocenium/ferrocene redox couple, and B) fluid with the ferrocenium/ferrocene redox couple. Each test system includes:
1. Reservoir for holding hydraulic fluid
2. Pump to pressurize fluid to typical service pressures
3. Pressurized fluid flow path to the test piece
4. Test pieces with internal flow geometry (especially spatial variation of fluid flow velocity) and materials of construction similar to the hydraulic valve being simulated
5. Return flow path on low-pressure side of valve, returning the fluid to the reservoir Each of the test systems supports simultaneous testing of multiple test pieces, by physically running the test pieces in parallel. The pump maintains constant inlet pressure to the test pieces, and in particular maintains this pressure as test pieces are isolated (i.e., valved-off) from the pressurized flow. This configuration permits removing selected test pieces for characterization after differing test times. Typical conditions operate each test system with five test pieces. Test pieces are tested after 100, 200, 500, 2000, and 5000 hours of operation.

Each test piece is sectioned, rinsed with fresh hydraulic fluid of the same type as used in formulating the test fluid (e.g., the same Skydrol or Hyjet hydraulic fluid product used in the aircraft system of interest), and submitted for physical and chemical characterization. Each test piece is characterized for material loss (corrosion/erosion) and/or material gain (electrodeposition/film formation) by optical microscopy and high-sensitivity analysis tools (e.g., electron probe microanalysis). The magnitude of observed material loss or gain is quantified for each pair of test pieces, one run in a fluid with and one run in a fluid without the ferrocenium/ferrocene redox couple, to evaluate efficacy of the redox couple. Other experimental parameters include, for example: (1) operation of test system at alternate temperatures and/or inlet pressures; (2) increasing contaminant concentrations to account for projected worse case values; and (3) adding test pieces with variations in surface machining/finishing properties representative of expected manufacturing variations.

Although the present specification discloses the use of preferred additives into hydraulic fluids, especially phosphate-ester-based hydraulic fluids, the disclosure further contemplates the use of the preferred compounds in the hydraulic systems on aircraft, spacecraft, vehicles, stationary equipment. The systems, methods, fluids, additives, and compounds set forth herein are further contemplated for use with manned or unmanned vehicles or objects of any type or in any field of operation in a terrestrial and/or non-terrestrial and/or marine or submarine setting. A non-exhaustive list of contemplated vehicles includes manned and unmanned aircraft, spacecraft, satellites, terrestrial, non-terrestrial vehicles, and surface and sub-surface water-borne vehicles, etc.

While the preferred variations and alternatives of the present disclosure have been illustrated and described, it will be appreciated that various changes and substitutions can be made therein without departing from the spirit and scope of the disclosure. When introducing elements of the present invention or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements.

What is claimed is:

1. A hydraulic fluid for use in a hydraulic fluid system, said hydraulic fluid comprising:
   a phosphate-ester-based compound; and
   an additive;
   wherein said additive comprises a redox couple, said redox couple comprising a metallocene couple.

2. The hydraulic fluid of claim 1, wherein the redox couple is provides a path for both oxidation currents and reduction currents in an hydraulic system.

3. The hydraulic fluid of claim 1, wherein the redox couple comprises a sandwich compound having the formula: $M(A_r)_2^{+/0}$, where M is a transition metal, and $A_r$ is an aryl compound.

4. The hydraulic fluid of claim 1 wherein the redox couple comprises a metallocene couple having the formula: $M(C_p)_2^{+/0}$, where M is a transition metal, and $C_p$ is a cyclopentadiene-containing compound.

5. The hydraulic fluid of claim 1, wherein the redox couple is selected from the group consisting of: $Fe(cyclopentadiene)_2^+$ and $Fe(cyclopentadiene)_2^0$; $Fe(pentamethylcyclopentadiene)_2^+$ and $Fe(pentamethylcyclopentadiene)_2^0$; $Ni(cyclopentadiene)_2^+$ and $Ni(cyclopentadiene)_2^0$; $Co(cyclopentadiene)_2^+$ and $Co(cyclopentadiene)_2^0$; decamethylferricinue and decamethylferrocene$^0$; and $Fe(pentamethylcyclopentadiene)_2^+$ and $Fe(pentamethylcyclopentadiene)_2^0$.

6. An object comprising the hydraulic fluid of claim 1.

7. A method for reducing rate of surface current induced degradation for components in a hydraulic system, the method comprising the step of:
   adding a hydraulic fluid to the hydraulic system, said hydraulic fluid comprising an additive, said additive comprising:
   a redox couple.

8. The method of claim 7, wherein said redox couple provides a path for both oxidation currents and reduction currents in the hydraulic system.

9. The method of claim 7, wherein the redox couple comprises a metallocene couple.

10. The method of claim 7, wherein the redox couple comprises a sandwich compound of the formula: $M(A_r)_2^{+/0}$, where M is a transition metal, and $A_r$ is an aryl compound.

11. The method of claim 7, wherein the redox couple comprises a metallocene couple having the formula: $M(C_p)_2^{+/0}$, where M is a transition metal, and $C_p$ is a cyclopentadiene-containing compound.

12. The method of claim 7, wherein the redox couples are selected from the group consisting of: $Fe(cyclopentadiene)_2^+$ and $Fe(cyclopentadiene)_2^0$;
   $Fe(pentamethylcyclopentadiene)_2^+$ and $Fe(pentamethylcyclopentadiene)_2^0$;
   $Ni(cyclopentadiene)_2^+$ and $Ni(cyclopentadiene)_2^0$; $Co(cyclopentadiene)_2^+$ and
   $Co(cyclopentadiene)_2^0$; decamethylferricinum$^+$ and decamethylferrocene$^0$; and
   $Fe(pentamethylcyclopentadiene)_2^+$ and $Fe(pentamethylcyclopentadiene)_2^0$.

* * * * *

UNITED STATES PATENT AND TRADEMARK OFFICE
CERTIFICATE OF CORRECTION

PATENT NO. : 9,546,338 B2
APPLICATION NO. : 15/010073
DATED : January 17, 2017
INVENTOR(S) : Harold E. Hager It is certified that error appears in the above-identified patent and that said Letters Patent is hereby corrected as shown below:

In the Claims

Claim 2, Column 13, Line 9, delete "couple is provides" and insert --couple provides--, therefor.

Claim 2, Column 13, Line 10, delete "in an hydraulic" and insert --in a hydraulic--, therefor.

Signed and Sealed this
Twenty-first Day of March, 2017

Michelle K. Lee
*Director of the United States Patent and Trademark Office*